(12) United States Patent
Kandikonda et al.

(10) Patent No.: US 8,125,888 B2
(45) Date of Patent: Feb. 28, 2012

(54) SESSION INITIATION PROTOCOL SURVIVABLE SERVER

(75) Inventors: Prasad V. Kandikonda, Minneapolis, MN (US); Harinarayana Arimilli, Minneapolis, MN (US)

(73) Assignee: Multi-Tech Systems, Inc., Moundsview, MN (US)

( * ) Notice: Subject to any disclaimer, the term of this patent is extended or adjusted under 35 U.S.C. 154(b) by 1009 days.

(21) Appl. No.: 11/466,582

(22) Filed: Aug. 23, 2006

(65) Prior Publication Data

US 2007/0047571 A1   Mar. 1, 2007

Related U.S. Application Data

(60) Provisional application No. 60/710,532, filed on Aug. 23, 2005.

(51) Int. Cl.
 *H04L 12/26* (2006.01)
(52) U.S. Cl. ....................................................... 370/216
(58) Field of Classification Search .......... 370/216–221, 370/237, 449
 See application file for complete search history.

(56) References Cited

U.S. PATENT DOCUMENTS

| | | | |
|---|---|---|---|
| 6,978,302 B1* | 12/2005 | Chisholm et al. | 709/224 |
| 7,394,803 B1* | 7/2008 | Petit-Huguenin et al. | 370/352 |
| 2003/0035414 A1* | 2/2003 | Beyda | 370/352 |
| 2005/0058123 A1* | 3/2005 | Horiba | 370/352 |
| 2005/0238160 A1* | 10/2005 | Sunstrum | 379/220.01 |
| 2006/0007915 A1* | 1/2006 | Frame | 370/352 |
| 2006/0077955 A1* | 4/2006 | Poustchi et al. | 370/352 |
| 2006/0182255 A1* | 8/2006 | Luck et al. | 379/220.01 |
| 2006/0235980 A1* | 10/2006 | Pote et al. | 709/227 |
| 2006/0270392 A1* | 11/2006 | Scott et al. | 455/414.2 |
| 2006/0291400 A1* | 12/2006 | Balasaygun et al. | 370/242 |
| 2007/0162613 A1* | 7/2007 | O'Neill et al. | 709/238 |
| 2008/0049734 A1* | 2/2008 | Zhakov et al. | 370/352 |
| 2008/0198997 A1* | 8/2008 | Sterman et al. | 379/220.01 |

FOREIGN PATENT DOCUMENTS

CA    2467482 A1 * 12/2003

* cited by examiner

*Primary Examiner* — Chirag Shah
*Assistant Examiner* — Amar Persaud
(74) *Attorney, Agent, or Firm* — Schwegman, Lundberg & Woessner, P.A.

(57) ABSTRACT

This document discusses, among other things, a telephony network having a server configured to provide selected communication functions following failure of a primary server.

25 Claims, 8 Drawing Sheets

SESSION INITIATION PROTOCOL SURVIVABLE SERVER

CROSS-REFERENCE TO RELATED PATENT DOCUMENTS

This document claims the benefit of priority, under 35 U.S.C. Section 119(e), to Prasad V. Kandikonda, U.S. Provisional Patent Application Ser. No. 60/710,532, entitled "SESSION INITIATION PROTOCOL SURVIVABLE SERVER," filed on Aug. 23, 2005, and is incorporated herein by reference.

TECHNICAL FIELD

This document pertains generally to telephony, and more particularly, but not by way of limitation, to a session initiation protocol survivable server.

BACKGROUND

Corporations with branch offices often rely on a communication network to conduct business. When a component of the network fails, certain components of the communication network are sometimes rendered inoperative, oftentimes to the financial detriment of the business. In some instances, the branch office may find that they are unable to make a routine telephone call or even an emergency 911 telephone call.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

The following detailed description includes references to the accompanying drawings, which form a part of the detailed description. The drawings show, by way of illustration, specific embodiments in which the present subject matter may be practiced. These embodiments, which are also referred to herein as "examples," are described in enough detail to enable those skilled in the art to practice the present subject matter. The embodiments may be combined, other embodiments may be utilized, or structural, logical and electrical changes may be made without departing from the scope of the present subject matter. The following detailed description is, therefore, not to be taken in a limiting sense, and the scope of the present subject matter is defined by the appended claims and their equivalents.

In this document, the terms "a" or "an" are used, as is common in patent documents, to include one or more than one. In this document, the term "or" is used to refer to a nonexclusive or, unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

An example of the present subject matter includes a device configured to function as a session initiation protocol (SIP) server for internet protocol (IP) phones at a remote office which provides local office survivability in the case of a LAN or WAN failure by providing local PSTN trunking.

One example of the device includes a gateway for branch offices supported by a central SIP-based telephone system. The gateway adapts analog telephone equipment to the IP network, thus enabling voice over IP communication.

One example of the device operates as a primary or secondary SIP server for IP telephones used at a remote office. In normal mode, the device transparently passes IP telephone registrations to the central PBX/server. This allows the remote IP telephones to function with a full feature set. In the event of a LAN or WAN failure, the present subject matter automatically redirects calls through local PSTN trunks connected to the gateway. In survivable mode, the SIP server built into the device takes full command providing station-to-station, station-to-trunk and trunk-to-station call support. The present subject matter allows the office to maintain communication with a limited feature set until full functionality is restored.

In the event of a LAN failure, one example of the present subject matter goes into LAN fail-over survivability mode. Since the LAN is down, IP phones will not function, however, inbound/outbound calls can still be made via analog telephones or PSTN lines directly connected to the present subject matter. As such, the user dials an extension to reach the PSTN trunk before making an outbound call.

In the event of a power failure, the present subject matter provides emergency transfer fail-over survivability. This is achieved, in one example, by connecting an analog telephone or facsimile machine to a first port and a PSTN to a second port. In this mode, the present subject matter automatically draws power from the PSTN line for the benefit of the analog telephone (or facsimile) to enable inbound/outbound calling.

In one example, if the central PBX/server supports IP trunking, then the device can also provide local PSTN access for emergency calls such as 911 as well as normal inbound/outbound calling, thus allowing a branch office to maintain a local telephone number for customers.

Figure 1:
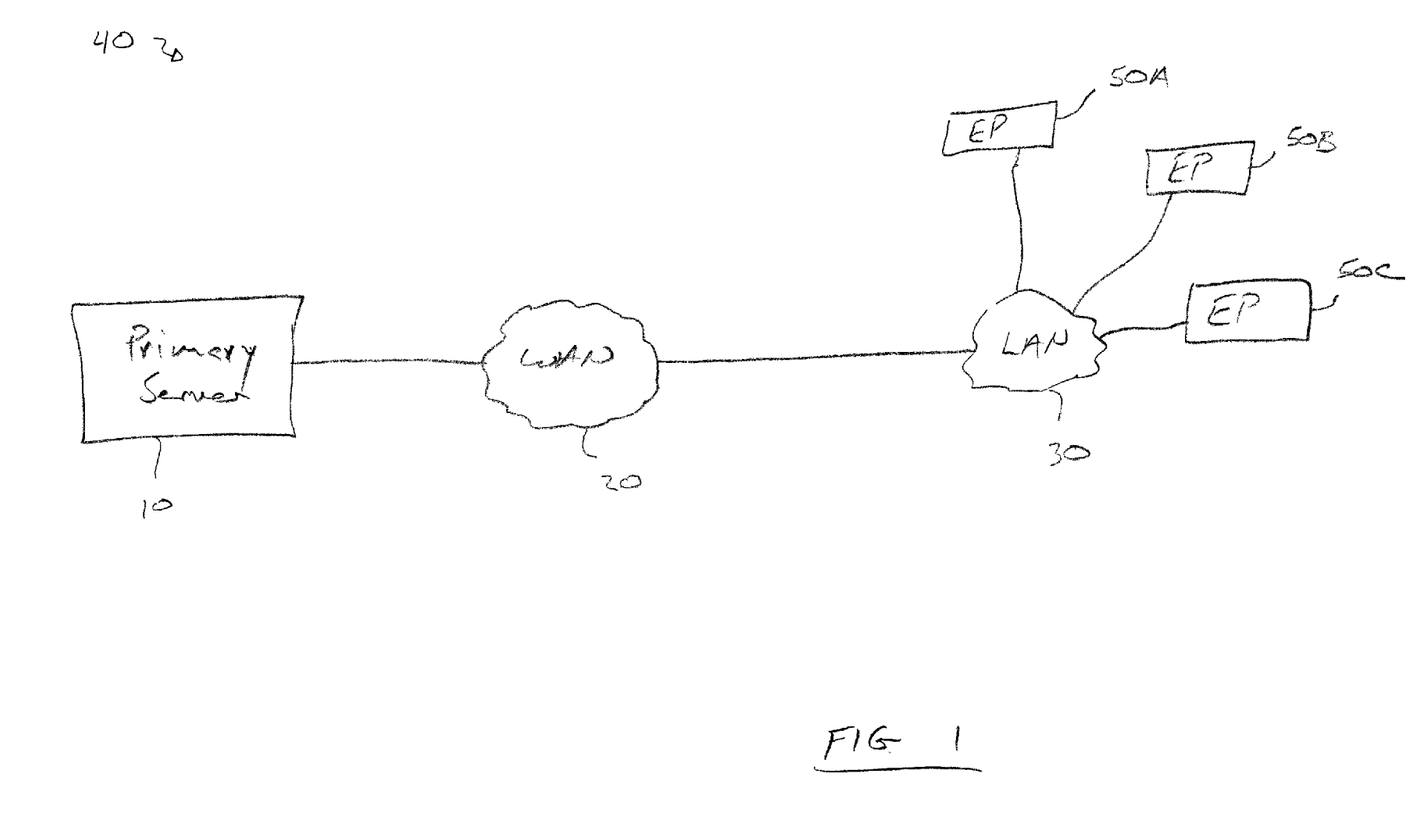
FIGS. 1 and 2 illustrate block diagrams of a network.

FIG. 1 illustrates communication system 40 including wide area network (WAN) 20. WAN 20 can include an intranet, the internet or other communication network. WAN is coupled to server 10 by infrastructure including, for example, a router, a gateway, a firewall or other such devices which are not illustrated in the figure. In the figure, server 10 is depicted as a primary server, however other servers (sometimes referred to as an alternate server, auxiliary or secondary server) can also be used and operated in parallel with the illustrated server. Server 10 can be located at a first geographical site, such as a company main office.

In the figure, WAN 20 is also coupled to local area network (LAN) 30, which, for example, may be located at a remote office site. WAN is coupled to LAN 30 by infrastructure including, for example, a router, a gateway, a firewall or other such devices which are not illustrated in the figure. LAN 30 can include an Ethernet, a virtual private network (VPN) or other local communication network such as Wi-Fi. In the figure, LAN 30 is coupled to endpoint 50A, endpoint 50B, and endpoint 50C, however greater or fewer endpoints are also contemplated. Each endpoint corresponds to a telephony device such as a telephone, a facsimile machine, a modem, a computer, an IP device, a gateway or other such device that can connect or register to a processor using IP. The gateway is treated as an endpoint in the case of a device coupled to LAN 30 via the gateway.

In FIG. 1, for example, endpoint 50A can communicate with primary server 10 by using LAN 30 and WAN 20. Primary server 10, in one example, includes a private branch exchange (PBX), a voice-over-IP (VOIP) server, hosted IP telephony services or other communication device that supports an exchange with the endpoint. In addition, the primary server enables endpoint 50A, for example, to conduct an exchange with endpoint 50B. The functionality provided by primary server 10 allows the exchange between endpoints to include a wide variety of features, including for example, caller identification, conference calling, selective transfer functions, and other services.

Upon a failure of primary server 10, the endpoints suffer a loss of service. In some instances, an alternate server running in parallel takes over and replaces the primary server. In one example, the primary server and alternate server communicate with each other using a non-standard (proprietary) protocol and the alternate server takes over when it detects that the primary server is unavailable. In one example, the switch from the primary to the alternate is handled by the endpoints (or phones) such that, if the endpoint cannot reach the primary, the endpoint will automatically switch to the alternate based on proprietary vendor-specific knowledge and intelligence built into the endpoint.

The pipeline coupled to WAN 20 can include various connections, including a T1 or an E1 trunk connection, any one of which can also fail and render the WAN link inoperative. The WAN link can also be inoperative as a result of failure of the primary (or secondary) server or other infrastructure.

In one example, endpoints 50A, 50B and 50C represent a cluster of SIP endpoints in private LAN 30 that are registered with server 10 on WAN 20. Each of endpoints 50A, 50B and 50C rely on server 10 for reaching any other endpoints also on LAN 30 or endpoints on another network. In addition to providing connectivity, server 10 may also provide a pool of features that can be used by the endpoints.

When the link to server 10 goes down, endpoints 50A, 50B and 50C lose connectivity and are unable to provide any service until the WAN link is restored.

Upon detecting the failure to reach server 10, the SIP endpoints may try to register with an alternate server coupled in parallel with server 10. The alternate server can take over provided that all the endpoints have certain capabilities. In particular, the endpoints must be capable of monitoring the status of the WAN link. In addition, the endpoints must be able to switch to the alternate server when server 10 is unreachable and also switch back to server 10 when it again becomes available.

Some endpoints are not so equipped to discern the condition and make changes. Such telephones lack functionality to determine a link failure or are configured to function as a 'dumb terminal' in which the link status is not checked.

Figure 2:
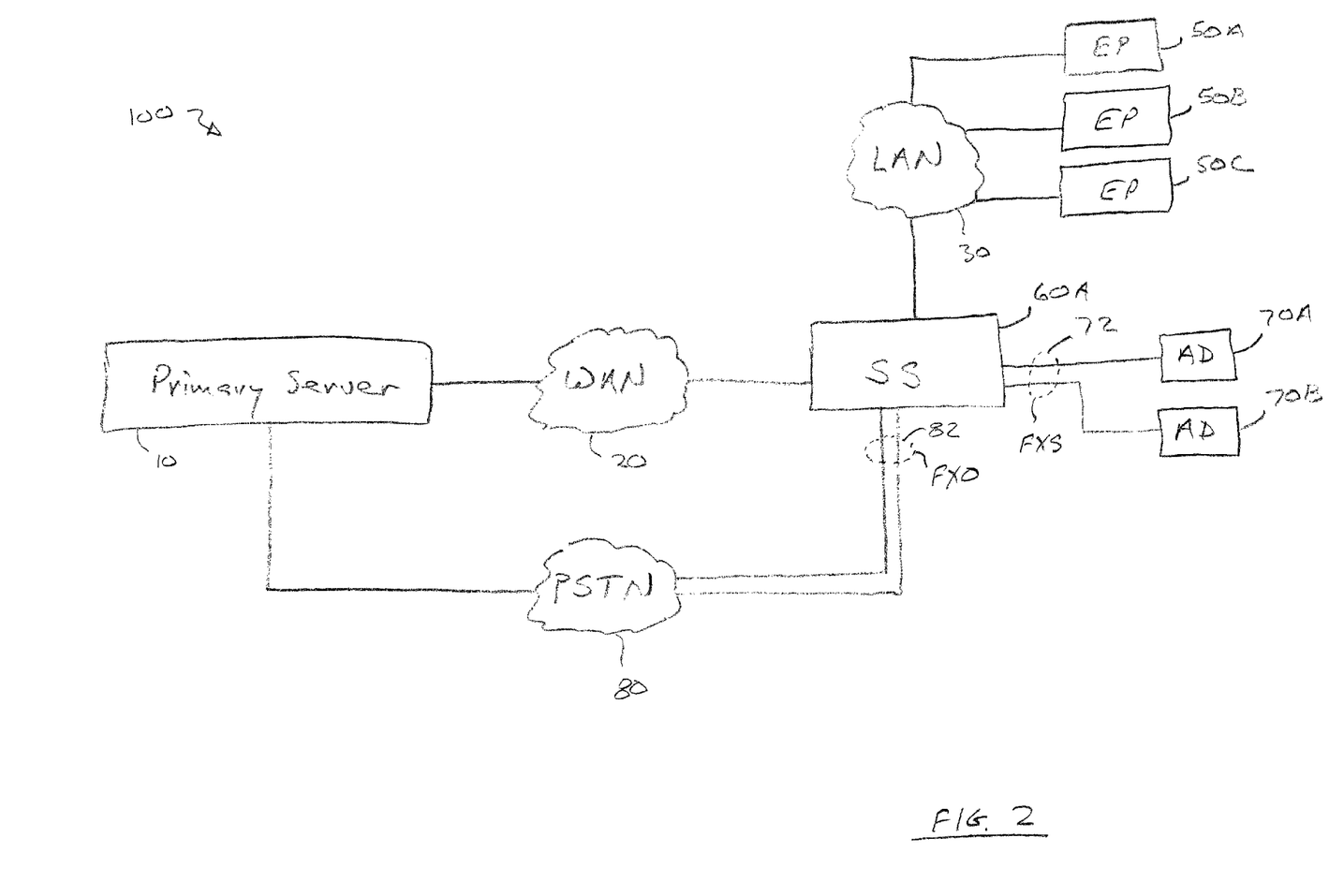

FIG. 2 illustrates communication system 100 including survivability server 60A coupled to WAN 20. Server 60A provides a survivability solution to a network of SIP endpoints when the link to server 10 goes down. Server 60A is coupled to public switched telephone network (PSTN) 80. PSTN 80 includes a circuit-switched telephone network and provides dial-up communication services.

On failure of the WAN link, server 60A is able to take control and provide services until the WAN link is restored. In the survivable mode of operation, server 60A manages traffic on PSTN 80 thus allowing continued connectivity for the SIP endpoints.

Lines 82 correspond to an analog trunked line which is coupled to server 60A at an interface known as a Foreign eXchange Office (FXO) which receives power and receives a ring signal. In addition, server 60A is coupled to analog device 70A and analog device 70B by lines 72 which are coupled to server 60A at an interface known as a Foreign eXchange Station (FXS) which provides power and generates ring signals. Analog devices 70A and 70B can be analog devices including plain old telephone service (POTS) equipment or keyed telephone service (KTS) equipment. Examples of such equipment include a modem, a facsimile machine, a telephone answering machine and a dial telephone. The figure illustrates two such devices, however greater or fewer number of such devices are also contemplated.

Server 60A is also coupled to LAN 30. In the figure, LAN 30 is coupled to endpoint 50A, endpoint 50B, and endpoint 50C, however greater or fewer endpoints are also contemplated. Each endpoint corresponds to an IP telephony device such as a telephone, a facsimile machine, a computer or other such device.

LAN 30 and WAN 20 are illustrated separately in the figure, and in one example, each is a physically separate network with separate ports. However, LAN 30 and WAN 20 can also be the same physical network with LAN 20 operating on one logical port and WAN 20 operating on a different logical port.

In FIG. 2, server 60A provides survivability services. Server 60A is located at the site of LAN 30 which is coupled to the endpoints. Server 60A functions as a primary server for the endpoints and accept registrations from these endpoints. Server 60A passes the registrations onto server 10.

Server 60A is configured to forward a request for a session from any of the SIP endpoints to server 10. Server 60A also monitors the status of the WAN link to server 10 so that on failure of the link, server 60A can either register the endpoints to an alternate server or take control by providing the requested service itself. On restoration of the WAN link, server 60A re-registers all the endpoints with the server 10.

In one example, the mode of operation of server 60A is determined by the availability of the WAN link. Availability of the WAN link can be determined by sending an Internet Control Message Protocol (ICMP) request from server 60A to server 10 and monitoring for a response. If no response is received or the response otherwise indicates that the WAN link is unavailable, then server 60A enters survivability mode, and if the response is appropriate to the request, then server 60A enters a normal mode. Availability of the WAN link can also be determined by monitoring a link signal on a physical port. The physical port, in one example, includes an Ethernet port. Other methods of determining availability of the WAN link are also contemplated.

In one example, the mode of operation of server 60A is determined by the availability of the primary server (for example, server 10 in FIG. 2). Availability of the primary server can be determined by various methods as described elsewhere in this document.

Session Initiation Protocol

In system 100, network traffic between the various elements is conducted using a protocol known as session initiation protocol (SIP).

SIP is a signaling protocol used for establishing sessions in an internet packet (IP) network. A session can be a two-way telephone call or a collaborative multi-media conference session. SIP enables a variety of services such as voice-enriched e-commerce, web page click-to-dial, Instant Messaging with buddy lists, and other services.

Voice over IP (VOIP) is an example of a communication function facilitated by SIP. SIP is a defined internet standard set forth at RFC 3261 (among others) set forth by the Internet Engineering Task Force (IETF), the body responsible for administering and developing the mechanisms that comprise the Internet.

SIP operates without knowing the details of a particular session but rather serves to initiate, terminate and manipulating the session. SIP is operable with a variety of network architectures and deployment scenarios.

SIP is a request-response protocol that closely resembles other Internet protocols including Hypertext Transfer Protocol (HTTP) and Simple Mail Transfer Protocol (SMTP). Using SIP, telephony is treated as a web application and integrates well with other Internet services. One purpose of SIP is to help session originators deliver invitations to potential session participants where the participant can move from place to place, change locations or change equipment. Calls can entail the use of multiple streams of various media and involve large numbers of participants.

SIP provides four basic functions. First, SIP allows for the establishment of user location (i.e. translating from a user's name to their current network address). Second, SIP provides for feature negotiation so that all of the participants in a session can agree on the features to be supported among them. Third, SIP is a mechanism for call management enabling, for example, adding, dropping, or transferring participants. Fourth, SIP allows for changing features of a session while it is in progress.

Users connect to the system using a user agent (UA). UAs can take the form of a software application or a hardware device such as an IP telephone or mobile phone supporting IM. Typically these devices are connected to a central server, referred to as a proxy, soft switch or gatekeeper. This central proxy is a more sophisticated network element than a web proxy. These proxies are typically responsible for registration of UAs, location of users within the system, and routing signaling traffic between UAs.

In general, a UA denotes the application that is receiving, processing, and presenting the requested file for the user. The UA might be a web browser, a browser plug-in, or some other application (such as a text-to-speech screen-reader).

Two SIP devices can be configured to communicate directly to each other, but in many systems of greater than two UAs, a central proxy is used. Messages are sent from the calling UA to the proxy, which is responsible for locating the other UA. SIP messages are passed from the proxy to the destination UA, possibly through additional intermediary proxies. Proxies are also responsible for authenticating UAs and administering user names. Proxies can be located either on site or at a central service provider.

SIP messages flowing through the central proxies make up the signaling portion of a VOIP call. For efficiency, the actual media packets that flow between UAs do not pass through proxies or intermediaries. This media stream travels directly between the endpoints, usually in the form of real time protocol (RTP) packets. This separation of signaling and content and the P2P nature of media exchange is analogous to existing P2P file-sharing systems that search with an overlay and exchange data directly.

A number of VOIP protocols are in use today. Older protocols such as H.323 place virtually all the intelligence in the central server, while SIP, a newer protocol, developed by the IETF, is designed to push some, but not all, of the intelligence to the UAs.

Methods

Figure 3A:
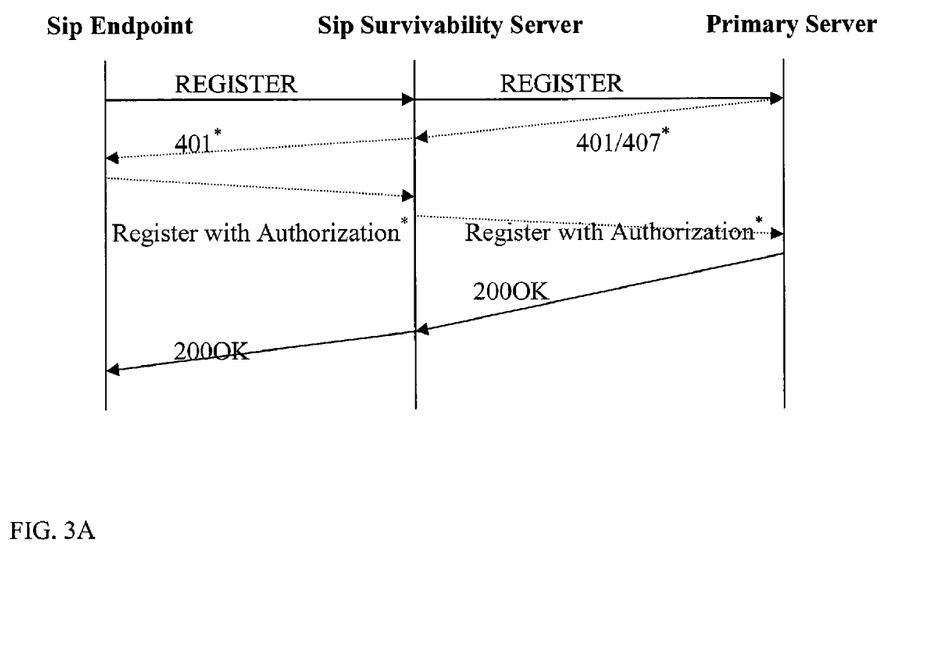
FIGS. 3A-3E illustrate ladder diagrams corresponding to methods implemented by embodiments of the present subject matter.

FIG. 3A illustrates an example of a ladder diagram showing the flow of registration of a SIP endpoint registration when server 60A is operating in a normal mode. Server 60A operates in a normal mode when WAN 20 and server 10 are operating properly and when the registration is successful. In the figure, the asterisk * denotes an option response and request.

Upon receiving the REGISTER, server 60A performs as follows:

a) check the status of server 10. If server 10 is reachable, then modify the header information and send the register to server 10;

b) update the registration database with the contact information of the endpoint;

c) if server 10 sends a 407-Proxy Authentication Required response, then server 60A generates a 401 with the WWW-Authenticate header matching the information given in the Proxy-Authenticate header and sends this 401 to the endpoint;

d) when the endpoint responds with the REGISTER with the Authorization header, server 60A modifies the headers and sends it to server 10 with the Proxy Authorization header sent by the endpoint; and e) upon receiving the 200 OK from server 10, server 60A updates the Registration database with the new Re-Registration time and sends the 200 OK back to the endpoint.

At predetermined intervals, the SIP endpoint sends the REGISTER. Server 60A intercepts the REGISTER and either pushes the message on to server 10 or allows the message to advance uninterrupted.

Figure 3B:
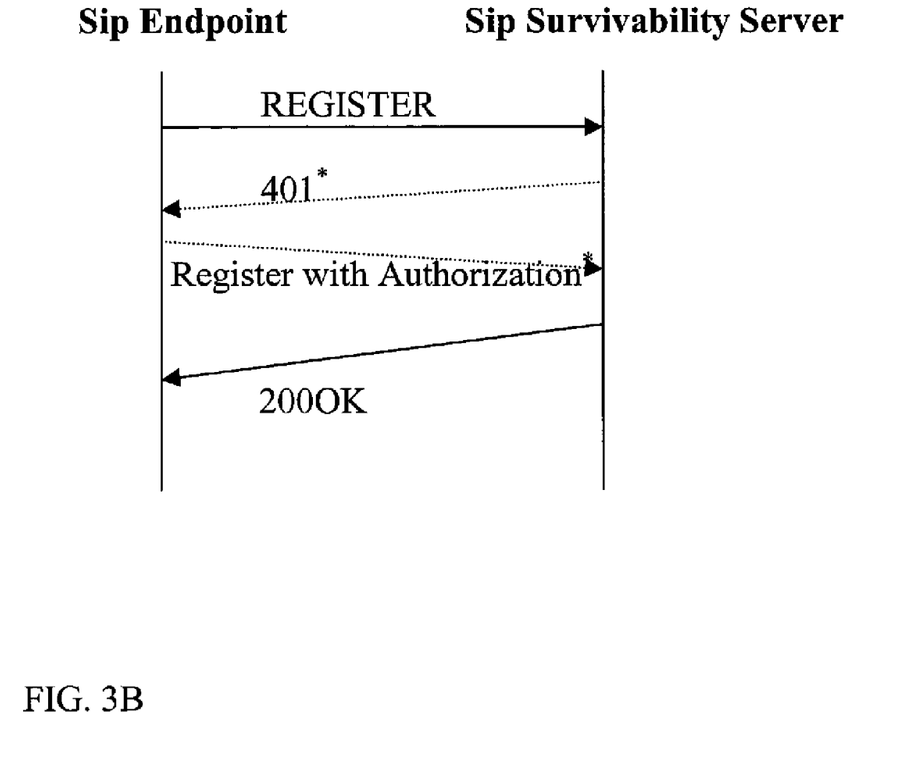

FIG. 3B illustrates an example of a ladder diagram showing the flow of registration of a SIP endpoint when server 60A operates in survivability mode (i.e. when the link to server 10 has failed) and the registration is successful.

Upon receiving the REGISTER, server 60A performs as follows:

a) if server 10 is unreachable, then server 60A checks its database to determine whether this particular endpoint requires Authentication. If authentication is required, then server 60A sends 401-Unauthorized to the endpoint;

b) upon receiving the Register from the Endpoint with the Authorization header, server 60A validates the received credentials;

c) upon successful validation of credentials, server 60A updates the Registration database with the received contact address and sends 200 OK to the endpoint.

Figure 3C:
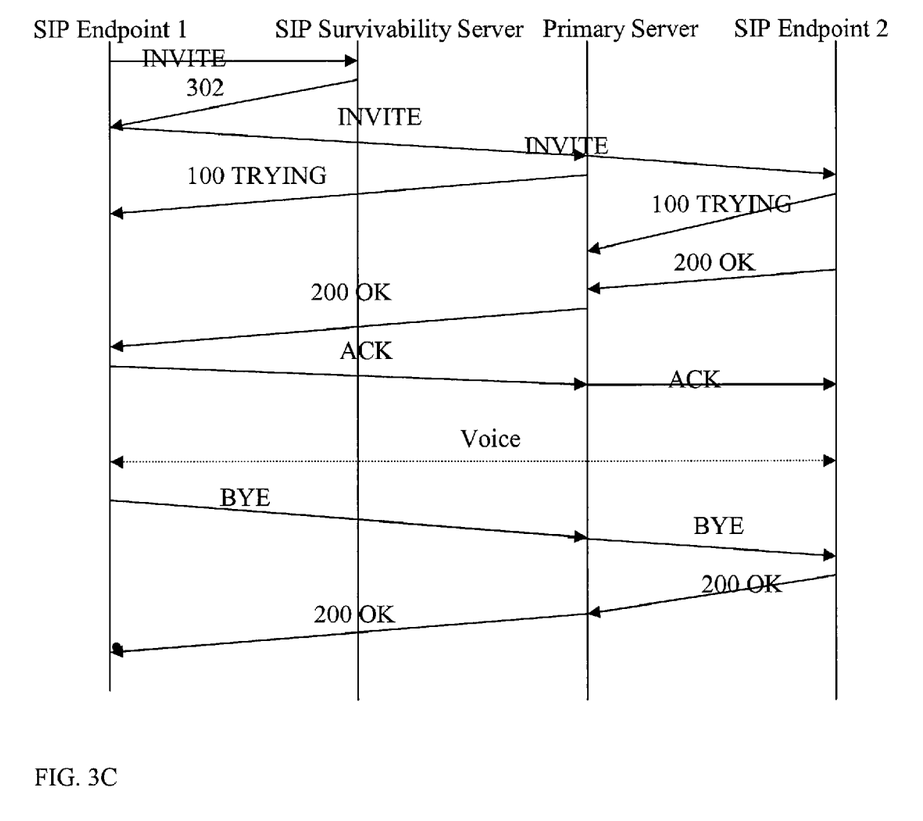

FIG. 3C illustrates an example of a ladder diagram showing typical call flow corresponding to an endpoint making a call to any other endpoint when server 60A operates in normal mode. Server 60A performs as follows:

a) upon receiving an INVITE from an endpoint, server 60A checks the status of server 10. If server 10 is reachable and if the endpoint is registered with server 10, it will send a 302-Contacting Primary with the contact address of server 10 to the endpoint;

b) upon receiving the 302, the endpoint sends the INVITE to server 10;

c) upon getting the INVITE, server 10 places the call to the called endpoint, after which server 60A is not involved in the flow of messages for this session and the signaling messages are exchanged between the endpoints and server 10.

Figure 3D:
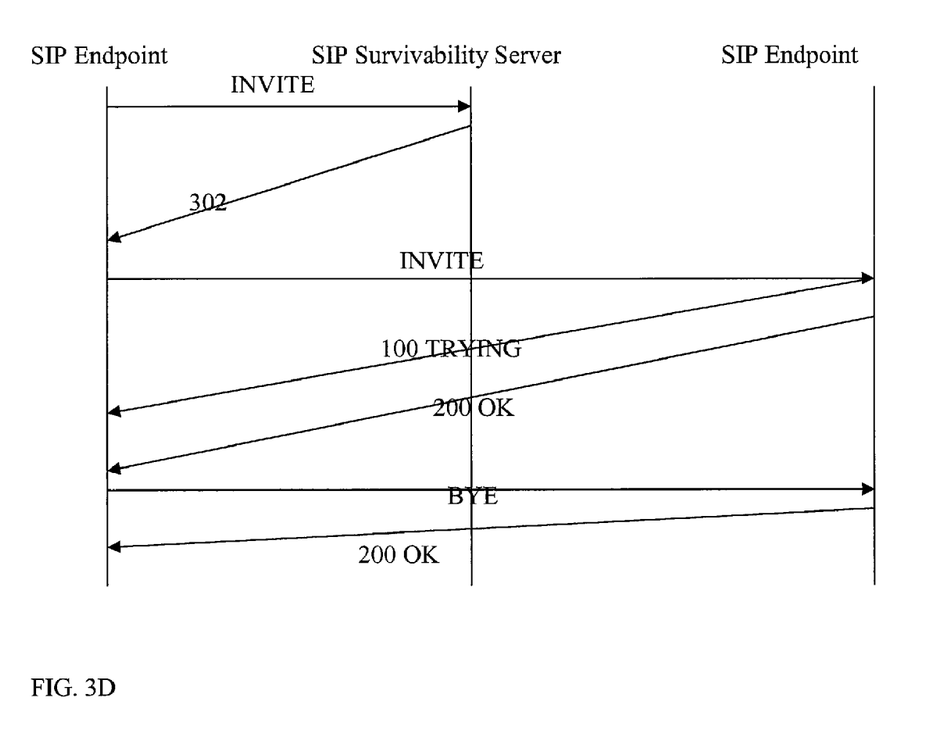

FIG. 3D illustrates an example of a ladder diagram showing typical call flow of an endpoint making a call to any other endpoint when server 60A is in survivable mode (i.e. the WAN link is down). Server 60A performs as follows:

a) upon receiving the INVITE, server 60A checks the status of server 10—if server 10 is unreachable, then server 60A searches its registration database for the Contact address of the called endpoint;

b) upon determining the contact address of the called endpoint, server 60A sends 302-Moved Temporarily response with the contact address of the called endpoint to the calling endpoint;

c) upon getting this 302, the calling endpoint makes a call to the called endpoint; and there after, server 60A is not involved in the flow of messages for this session and the signaling messages occurs between the endpoints.

Figure 3E:
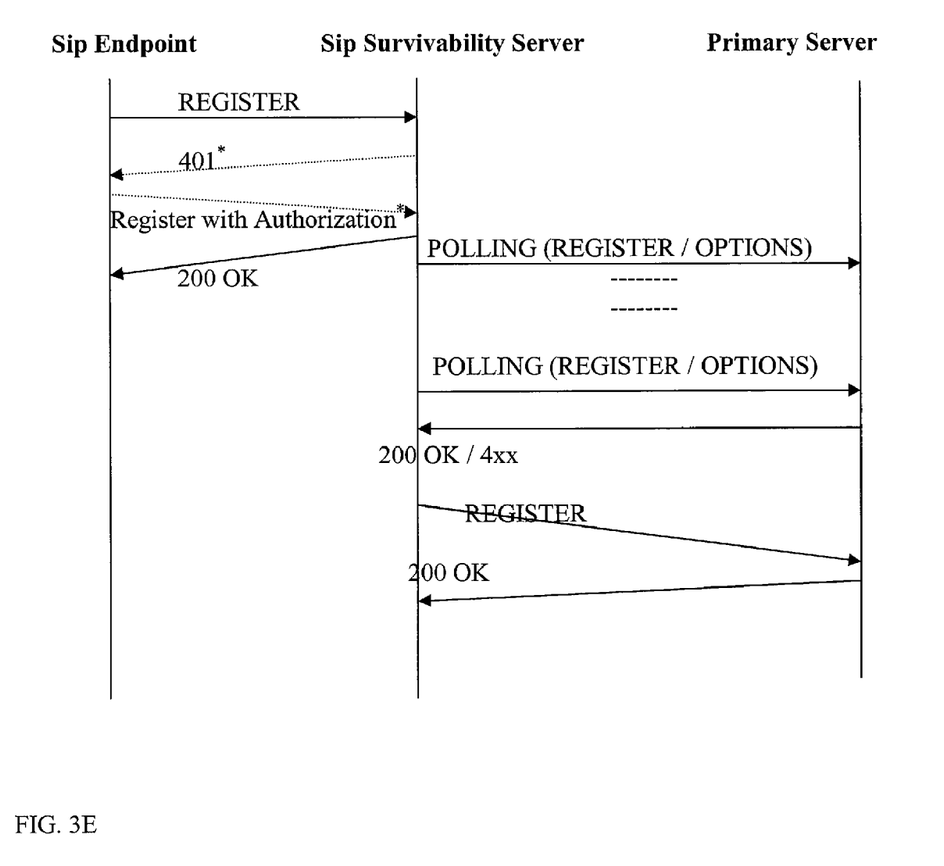

FIG. 3E illustrates a ladder diagram showing an example where server 60A accepts the registrations from endpoints while in survivability mode and also illustrates a method of polling for the availability of server 10 and transferring the registrations of the endpoints to server 10 successfully when server 10 is reachable. Server 60A performs as follows:

a) if server 10 is not reachable, then server 60A checks its database to determine whether this particular endpoint requires Authentication—if the particular endpoint requires authentication, then server 60A sends 401-Unauthorized to the endpoint;

b) upon receiving the Register from the endpoint with the Authorization header, server 60A validates the received credentials;

c) upon successful validation of credentials, server 60A updates the Registration database with the received contact address and sends 200 OK to the endpoint; meanwhile, server 60A continues to poll server 10 to determine availability;

d) when server 10 respond to the Polling request, server 60A registers the endpoint with server 10.

When operating in survivable mode, server 60A is configured to provide selected basic (core) support services. In one example, server 60A is configured to restore full functionality of that of a primary server. Core services can include 911 outgoing calls, inter-LAN calls, call transfer, conference, and others.

Device Architecture

Figure 4:
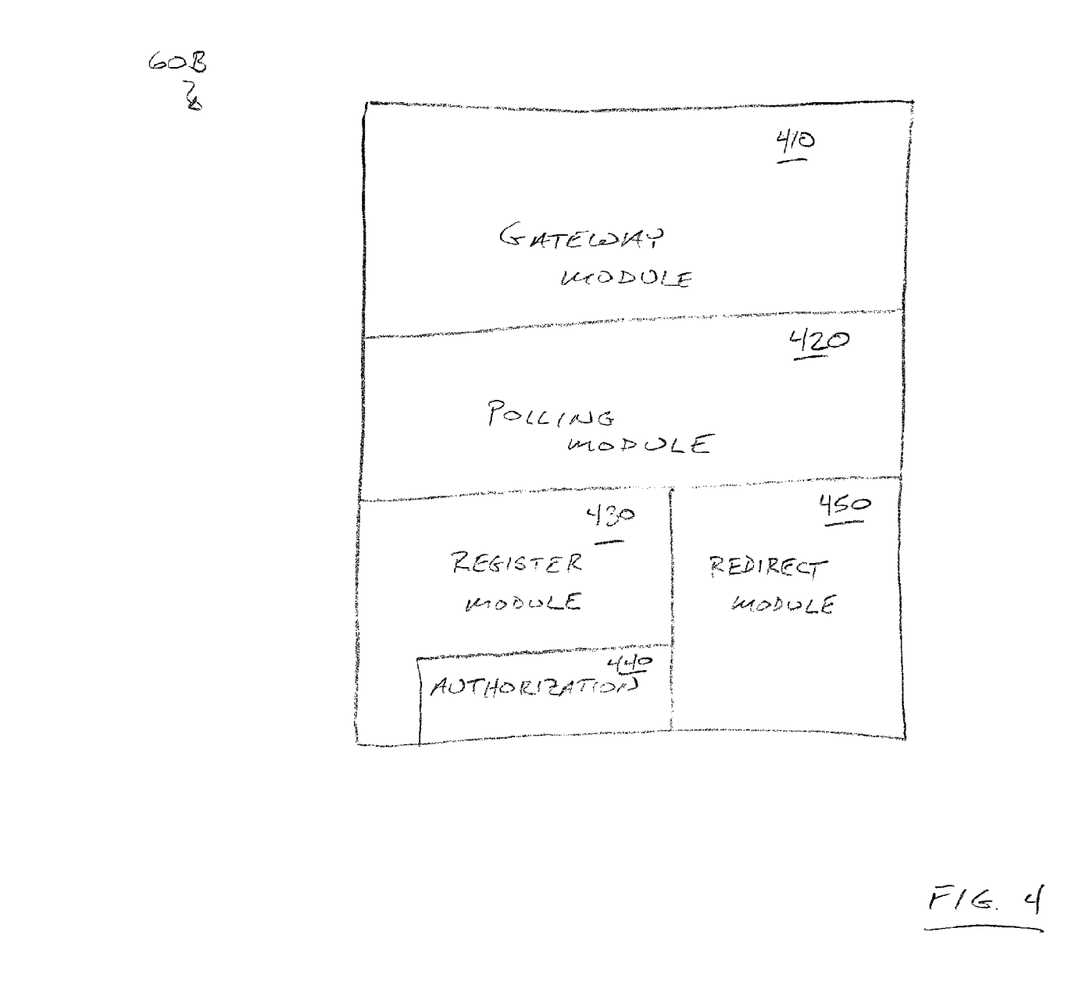
FIG. 4 illustrates a block diagram of a device according to the present subject matter.

FIG. 4 illustrates a block diagram of selected elements of server 60B according to one example. In the figure, server 60B includes gateway module 410, polling module 420, register module 430, redirect module 450, and authorization module 440. Different numbers of modules and different arrangements of modules are also contemplated for any particular device. For example, gateway module 410 can be implemented as part of a telephone device separate from other elements of server 60B.

By registering to server 60B, the endpoints enjoy gateway access to allow continued functionality while the WAN link is inoperative. Server 60B, in one example, is compliant with SIP, however, other communication protocols or standards are also contemplated.

In one example, server 60B uses a single processor having instructions for certain functions. Server 60B allows any endpoint that can operate with LAN 30 to benefit from the intelligence implemented in server 60B and thus, allowing greater flexibility in the selection of endpoints for use with system 100. A generic SIP-based endpoint can be used to register to server 60B.

Gateway module 410, in one example, includes an FXS/FXO interface that enables coupling to PSTN 80 (FIG. 2) as well as analog devices 70A and 70B (FIG. 2). Gateway module 410 is configured to allow or control access to PSTN 80. Other types of interfaces are also contemplated, including, for example, an E&M (ear and mouth) interface. Gateway module 410 can register to server 10 or an alternate server and can be viewed as another endpoint device or telephone. In one example, gateway module 410 communicates with server 10. Gateway module 410 includes an interface to provide service access to POTS such as 911 telephone call support.

Gateway module 410 functions as an analog telephone adapter (ATA) adapting analog telephones and facsimile machines to the IP environment.

In one example, gateway module 410 includes a host processor, a codec, and a digital signal processor (DSP). The codec includes a compressor-decompressor, and also converts analog to digital. The DSP can be a processor or other module to further process the signal.

Polling module 420 is configured to determine if server 10 is available. Determining the availability of server 10 includes checking WAN 20 as well as any devices or functions along the communication path. Polling module 420 is configured to check availability of server 10 by monitoring for a reply to a message previously sent to server 10.

Polling of WAN 20 can be user configurable or non-user configurable. For example, with a user-selected frequency of 10 minutes, polling module 420 transmits a Register packet or an Options packet pursuant to RFC 3261. In response to the Register packet or Options packet, server 10 provides a reply. The reply, if any, is evaluated by server 60B to determine availability of server 10.

Other messages can also be used to discern the condition of the WAN link in general (or availability of server 10, in particular). Generally, any message that normally triggers a reply from server 10 can be used for polling. The message can be an inquiry that causes no substantial configuration changes at server 10. In one example, the polling message can include a request to change a configuration of server 10 and after having received a reply, polling module 420 sends a request to revert to a previous configuration. In one example, the message sent by polling module 420 triggers no consequential changes.

In one example, polling module 420 monitors traffic for a fault signal denoting failure of primary server 10. Upon receiving the fault signal, server 60B enters survivable mode and provides services.

In one example, polling module 420 sends a positive inquiry to determine availability of server 10. The positive inquiry can be sent at regular intervals, at a particular event, or a predetermined time period after a selected event (such as an interval of silence).

Polling module 420 can monitor for a hand-shake signal to indicate that the link is down.

The message used for polling can be user selected or otherwise programmed. In one example, the message is a SIP-based message used for polling to determine the status of the primary/alternate server. Server 60B can interpret a received reply to denote that the primary/alternate server does not understand the polling message, that the primary/alternate server has implemented a requested change, that the primary/alternate server is functioning properly, or that certain functions are available at the primary/alternate server. Other messages can also be received and interpreted to denote operability of the WAN link.

In one example, polling module 420 executes a watch function to determine status of the WAN link. As such, server 60B monitors network traffic from server 10 and upon detecting a period of silence meeting certain criteria, then server 60B enters the survivability mode and assumes control of communication with the endpoints. For example, if the period of silence is greater than a predetermined duration, then server 60B assumes that the WAN link is inoperative. An example of traffic that can be monitored for an indication of WAN link operability is a broadcast packet.

Register module 430 provides services to manage endpoint addresses. Register module 430 includes a database or access to a database of stored registration data.

Registrar module 430 is configured to enable server 60B to act as the primary server for the SIP endpoints and includes registrar functionality for accepting the registrations from the endpoints.

Registrar module 430, in one example, has access to a registration database which can be integrated with the device or provided by a separate storage device. Registrar module 430 maintains the registration information provided by the endpoint. Registration information is used for providing the redirect details as well as for re-registering with server 10 (or alternate servers) upon restoration of the connectivity with them.

In one example, registration module 430 includes authorization module 440. Authorization module 440 is configured to verify authorization to access a selected service. When server 60B is operating in survivability mode, authenticate of the incoming registration requests is handled by authentication module 440. An example of functionality of redirect module 430 is illustrated in FIG. 3C.

Redirect module 450 provides functionality to supply the contact details for the incoming call requests made by any of the endpoints to any other endpoint. Server 60B is configured to support redirecting of an incoming call to the primary server. Because the endpoints may be unaware of the existence of the primary/secondary server, the endpoints will ordinarily send the incoming calls to server 60B. When server 10 is operable, server 10 provides the requested service. In this case, server 60B redirects the endpoint to contact the server 10.

In one example, redirect module 450 includes a Back-To-Back User Agent (B2BUA) or a true proxy server.

When configured with a B2BUA, server 60B completes the call directly to server 10 which then connects to the destination endpoint. Certain features of the endpoint may be unavailable because server 60B may have limited support for advanced features that are otherwise recognized by the endpoint or the primary server.

A B2BUA is a SIP-based logical entity that can receive and process INVITE messages as a SIP User Agent Server (UAS). It also acts as a SIP User Agent Client (UAC) that determines how the request should be answered and how to initiate outbound calls. Unlike a SIP proxy server, the B2BUA maintains complete call state and participates in all call requests.

A true proxy server provides call routing and call blocking.

Server 60B facilitates relaying the registrations to the server 10 and passing the server 10 response back to the endpoint. When server 10 is reachable, the server 60B forwards the incoming registration requests to server 10 so that server 10 can provide the requested service to the endpoints. Server 60B also passes on the responses received from the server 10 to the endpoint.

Server 60B monitors the status of server 10. Since server 60B makes decisions as to taking and relinquishing control of providing services to the endpoints based on the reachability of server 10, server 60B monitors the availability of server 10.

Server 60B supports registering of the endpoints with a secondary server when server 10 is unreachable and a secondary server is configured. For example, in the case where a primary server is unreachable and a secondary server is available, server 60B determines the availability of the secondary server and if available, registers the endpoints to the secondary server, thus enabling the secondary server to manage the session.

Server 60B provides support for redirecting the incoming requests based on the local registrations when server 10 (and when any secondary server) is unreachable. Since server 60B takes control when server 10 is not reachable, server 60B provides the redirection service along with contact details of the called endpoint when there is an incoming call request.

Server 60B provides support for re-registering the endpoints with server 10 when it becomes reachable again. When server 10 is not reachable, server 60B will either register the endpoints with a secondary server or server 60B will take control and provide that service itself. When server 10 is reachable again, server 60B registers again all the endpoints with the server 10.

Server 60B provides support for registering the gateway ports to server 10 and handles it in the same way as any other endpoint. Since server 60B includes a gateway, server 60B registers its gateway ports with server 10 similar to any other endpoint.

It will be appreciated that certain elements of the present subject matter are compatible with the SIP standard. However, other standards-based protocols, such as adaptations of SIP (or another standard), are also contemplated.

Portions of the present subject matter are implemented in hardware and software. In one example, a combination of a hardware device (having connectors and interfaces as described herein) and software (executing instructions on a processor of a computer or an integrated processor) are used to implement the present subject matter.

CONCLUSION

An example of the present subject matter includes a survivable SIP gateway with server.

It is to be understood that the above description is intended to be illustrative, and not restrictive. For example, the above-described embodiments (and/or aspects thereof) may be used in combination with each other. Many other embodiments will be apparent to those of skill in the art upon reviewing the above description. The scope of the subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, various features may be grouped together to streamline the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment.

Thus the following claims are hereby incorporated into the Detailed Description, with each claim standing on its own as a separate embodiment.

What is claimed is:

1. A method for selecting an operating mode of a first server in a communication network, the method comprising:

sending a session initiation protocol (SIP) polling message from the first server to a second server using a first communication link, the first server is coupled to at least one endpoint configured as an analog telephone device; and monitoring for a reply message from the second server, the reply message based on the polling message and upon receiving the reply message selecting a first mode of operation for the first server, wherein when in the first mode of operation, the second server is configured to register the at least one endpoint and configured to enable the at least one endpoint to communicate using the first communication link; and upon absence of the reply message, selecting a second mode of operation for the first server, wherein when in the second mode of operation, the first server is configured to register the at least one endpoint and configured to enable the at least one endpoint to communicate using a second communication link of the communication network, the second communication link separate from the first communication link and including a public switched telephone network (PSTN).

2. The method of claim 1 wherein sending the SIP polling message includes at least one of sending an inquiry message and sending a request message.

3. The method of claim 1 wherein monitoring includes waiting for a predetermined period of time.

4. The method of claim 1 wherein selecting the first mode of operation includes forwarding registration information from an endpoint to the second server.

5. The method of claim 4 further including redirecting a call from the endpoint to a destination, wherein the destination is selected based on the registration information at the second server.

6. The method of claim 5 further including exchanging network traffic using a public switched telephone network (PSTN).

7. The method of claim 1 wherein selecting the second mode of operation includes authenticating registration information at the first server, the registration information corresponding to an endpoint.

8. The method of claim 7 further including redirecting a call from the endpoint to a destination, wherein the destination is selected based on the registration information at the first server.

9. A system comprising:

an interface configured to couple to a wide area network (WAN), a local area network (LAN), at least one endpoint configured as an analog telephone device, and a public switched telephone network (PSTN);

a processor coupled to the interface and having instructions stored thereon configured to:

send a session initiation protocol (SIP) polling message from the interface to a remote server using the WAN, the interface coupled to at least one endpoint configured as an analog telephone device; and monitor for a reply message from the remote server, the reply message based on the polling message and upon receiving the reply message, select a first mode of operation for the interface, wherein when in the first mode of operation, the remote server is configured to register the at least one endpoint and configured to enable the at least one endpoint to communicate using the WAN; and upon absence of the reply message, select a second mode of operation for the interface, wherein when in the second mode of operation, the interface is configured to register the at least one endpoint and configured to enable the at least one endpoint to communicate using the LAN and the PSTN, the LAN separate from the WAN.

10. The system of claim 9 wherein the WAN includes an internet.

11. The system of claim 9 further wherein the interface includes an endpoint, and wherein the endpoint includes a device configured to communicate using SIP.

12. The system of claim 11 wherein the endpoint includes at least one of a telephone, a facsimile machine, an Internet Protocol (IP) device, and a gateway.

13. The system of claim 9 further wherein the processor is configured to determine operability of the WAN by monitoring for a reply to a predetermined polling message.

14. The system of claim 9 wherein the processor is configured to authenticate an endpoint on the LAN.

15. A non-transitory computer readable medium having instructions stored thereon for executing a method comprising:

receiving registration information from each of at least one endpoint of a local area network (LAN), the LAN coupled to a first server configured for communicating a session initiation protocol (SIP) message with a second server using a wide area network (WAN);

determining availability of the second server; and if the second server is operable, then sending the registration information on the WAN to the second server, the second server is configured to register the at least one endpoint and configured to enable the at least one endpoint to communicate using the WAN; and if the second server is inoperable, then registering the at least one endpoint with the first server and forwarding contact information for a destination endpoint from the first server to the at least one endpoint to enable communications between the at least one endpoint and the destination endpoint using a public switched telephone network (PSTN) coupled to the first server.

16. The computer readable medium of claim 15 wherein determining includes monitoring for a reply to a message sent by the first server.

17. The computer readable medium of claim 15 further wherein the first server is configured to establish communications between endpoints.

18. The computer readable medium of claim 15 further including detecting restoration of operability of the second server.

19. The computer readable medium of claim 18 further including providing the registration information to the second server upon detecting the restoration of the operability of the second server.

20. A non-transitory computer readable medium having instructions stored thereon for executing a method comprising:

receiving registration information from each of at least one endpoint of a local area network (LAN), the LAN coupled to a first server configured for communicating a session initiation protocol (SIP) message with a first link to a wide area network (WAN);

determining operability of the first link; and if the first link is operable, then sending the registration information on the WAN to a second server coupled to the WAN, the second server is configured to register the at least one endpoint and configured to enable the at least one endpoint to communicate using the first link; and if the first link is inoperable, then registering the at least one endpoint with the first server and forwarding contact information for a destination endpoint from the first server to the at least one endpoint to enable communications between the at least one endpoint and the destination endpoint using a second link separate from the first link, the second link including a public switched telephone network (PSTN).

21. The computer readable medium of claim 20 wherein determining includes monitoring for a response to an Internet Control Message Protocol (ICMP) request message sent by the first server.

22. The computer readable medium of claim 20 wherein determining includes monitoring for a link signal on a physical port coupled to the first server.

23. The computer readable medium of claim 20 further wherein the first server is configured to establish communications between endpoints.

24. The computer readable medium of claim 20 further including detecting restoration of operability of the first link.

25. The computer readable medium of claim 24 further including providing the registration information to the second server upon detecting the restoration of the first link.

* * * * *